(12) United States Patent
Li et al.

(10) Patent No.: US 12,326,864 B2
(45) Date of Patent: Jun. 10, 2025

(54) METHOD AND SYSTEM FOR OPERATION OBJECTS DISCOVERY FROM OPERATION DATA

(71) Applicant: INTERNATIONAL BUSINESS MACHINES CORPORATION, Armonk, NY (US)

(72) Inventors: Jia Qi Li, Beijing (CN); Fan Jing Meng, Beijing (CN); Pei Ni Liu, Beijing (CN); Junmei Qu, Beijing (CN); Zi Xiao Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 16/819,143

(22) Filed: Mar. 15, 2020

(65) Prior Publication Data

US 2021/0286819 A1    Sep. 16, 2021

(51) Int. Cl.
*G06F 16/353*  (2025.01)
*G06F 16/215*  (2019.01)
*G06F 16/2455*  (2019.01)
*G06N 5/04*  (2023.01)
*G06N 20/00*  (2019.01)
*G06F 16/334*  (2025.01)

(52) U.S. Cl.
CPC ...... *G06F 16/24558* (2019.01); *G06F 16/215* (2019.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,639,868 B1 | 12/2009 | Regli et al. | |
| 7,827,186 B2 | 11/2010 | Hicks | |
| 8,738,972 B1 | 5/2014 | Bakman et al. | |
| 8,862,728 B2 | 10/2014 | Jayachandran et al. | |
| 9,244,983 B2 | 1/2016 | Yang et al. | |
| 9,734,005 B2 | 8/2017 | Ruan et al. | |
| 10,373,094 B2 | 8/2019 | Naous et al. | |
| 10,505,825 B1 | 12/2019 | Bettaiah et al. | |

(Continued)

FOREIGN PATENT DOCUMENTS

CN  109921938 A  6/2019

OTHER PUBLICATIONS

List of IBM Patents or Patent Applications Treated as Related, 2 pgs.

(Continued)

*Primary Examiner* — Yu Zhao
(74) *Attorney, Agent, or Firm* — Intelletek Law Group, PLLC; Gabriel Daniel, Esq.

(57) ABSTRACT

A method and system for operation objects discovery from operation data includes performing pattern matching of operation data with patterns in a database. Fields in the operation data are identified as having matching patterns with the database as first potential objects. Data profiling is performed on unmatched fields of the operation data to generate data profiles. The data profiles are field classified and second potential objects are generated. The first potential objects and the second potential objects are de-duplicated, and operation objects are generated.

17 Claims, 8 Drawing Sheets

(56) References Cited

U.S. PATENT DOCUMENTS

| | | |
|---|---|---|
| 10,725,982 B2 | 7/2020 | Scheideler et al. |
| 11,244,345 B2 | 2/2022 | Pradeep |
| 2003/0212654 A1* | 11/2003 | Harper .................. G06Q 30/02 |
| 2004/0078364 A1 | 4/2004 | Ripley |
| 2004/0143508 A1 | 7/2004 | Bohn |
| 2004/0243548 A1 | 12/2004 | Hulten et al. |
| 2007/0038938 A1 | 2/2007 | Canora |
| 2008/0184001 A1* | 7/2008 | Stager ................ G06F 11/1453 |
| | | 711/167 |
| 2008/0213768 A1 | 9/2008 | Cai et al. |
| 2009/0024555 A1 | 1/2009 | Rieck |
| 2010/0332540 A1 | 12/2010 | Moerchen et al. |
| 2011/0225173 A1 | 9/2011 | Gulhane |
| 2012/0272249 A1* | 10/2012 | Beaty .................... G06F 9/5083 |
| | | 719/318 |
| 2012/0323921 A1 | 12/2012 | Chen |
| 2014/0074764 A1* | 3/2014 | Duftler .................. G06N 5/025 |
| | | 706/47 |
| 2014/0344622 A1 | 11/2014 | Huang et al. |
| 2015/0170022 A1 | 6/2015 | Malik et al. |
| 2015/0242384 A1 | 8/2015 | Reiter |
| 2016/0062972 A1* | 3/2016 | Ramakrishnan ...... G06F 40/186 |
| | | 715/226 |
| 2016/0124823 A1 | 5/2016 | Ruan et al. |
| 2017/0132060 A1 | 5/2017 | Nomura et al. |
| 2017/0185910 A1 | 6/2017 | Appel et al. |
| 2017/0186249 A1 | 6/2017 | Bandy et al. |
| 2017/0213127 A1 | 7/2017 | Duncan |
| 2017/0249200 A1 | 8/2017 | Mustafi et al. |
| 2017/0262429 A1 | 9/2017 | Harper |
| 2017/0270154 A1* | 9/2017 | Stephens ........... G06F 16/24573 |
| 2018/0144041 A1 | 5/2018 | Chen et al. |
| 2019/0058643 A1 | 2/2019 | Knowles et al. |
| 2019/0095313 A1* | 3/2019 | Xu ........................ G06F 11/008 |
| 2019/0303459 A1 | 10/2019 | Yan |
| 2020/0004813 A1 | 1/2020 | Galitsky |
| 2020/0380212 A1* | 12/2020 | Butler .................... G06N 20/00 |
| 2021/0117868 A1* | 4/2021 | Sriharsha .......... G06F 16/24568 |
| 2021/0149915 A1* | 5/2021 | Lee ..................... G06F 16/2282 |
| 2021/0286826 A1 | 9/2021 | Li et al. |
| 2022/0032982 A1 | 2/2022 | Shenton |

OTHER PUBLICATIONS

Debnath, B. et al., "LogLens: A Real-time Log Analysis System"; IEEE 38th International Conference on Distributed Computing Systems (2018), pp. 1052-1062.

Mell, P. et al., "Recommendations of the National Institute of Standards and Technology"; NIST Special Publication 800-145 (2011); 7 pgs.

Disclosed Anonymously, IP.com No. IPCOM000224872D "Method and system to detect and predict problems based on pattern recognition of large amounts of logs in multiple dimensions under cloud environment", Jan. 9, 2013, 16 pages.

Disclosed Anonymously, IP.com No. IPCOM000251608D "Method and System for Automated Problem Detection in A Multi-System Distributed Cloud Computing Environment", Nov. 15, 2017, 4 pages.

Lin et al. "Log Clustering based Problem Identification for Online Service Systems"; ICSE, May 2016, 10 pages.

Puri Colin, "Event Correlation across Log Files: What is it and Why is it Important?"; Accenture.com, Technology Labs Blog, Apr. 30, 2014, 3 pages.

Wang et al. "Grano: Interactive Graphbased Root Cause Analysis for CloudNative Distributed Data Platform", Proceedings of the VLDB Endowment, Aug. 1, 2019, pp. 1942-1945, vol. 12, Issue 12.

Xu et al., "Detecting Large-Scale System Problems by Mining Console Logs"; SOSP '09: Proceedings of the ACM SIGOPS 22nd symposium on Operating systems principles, Oct. 11, 2009, pp. 117-132.

Zheng et al., "System Log Pre-processing to Improve Failure Prediction", Proceedings of DSN, 2009, 6 pages.

Disclosed Anonymously. IP.com No. IPCOM000220081D, "Intelligent log framework for distributed environment applications", Jul. 20, 2012, 7 pages.

Disclosed Anonymously. IP.com No. IPCOM000258375D, An interactive system for the automated workload discovery, visualization and analysis in complex IT environments, May 6, 2019, 10 pages.

* cited by examiner

```
"class" : "BookingServiceImpl1",
"fun" : "getBookingsByUser",
"host" : "192.168.122.141",
"api" : "/bookings/byuser/{user}",
"user" : "uid130@email.com",
"bookings" : {"_id" : "8abcf30f-024e-4948-997d-cf4e18455358",
              "customerId" : "uid130@email.com",
              "flightId" : "a8f8e26d-7f3c-49b9-aa66-62fceb1bbd67",
              "dateOfBooking" : "Thu Sep 12 05:53:12 GMT 2019"}
```

FIG. 3

METHOD AND SYSTEM FOR OPERATION OBJECTS DISCOVERY FROM OPERATION DATA

BACKGROUND

Technical Field

The present disclosure generally relates to hybrid cloud and multi-cloud computing. More particularly, the present disclosure relates to workload distribution across a hybrid cloud or a multi-cloud environment.

Description of the Related Art

There continues to be an increase in the use of cloud computing, particular distributing a workload across a hybrid cloud or multi-cloud computing environment. Hybrid cloud computing is a type of strategy for operation of a single type of task. On the other hand, multi-cloud computing is a type of cloud management strategy in which several providers may be used to perform more than one type of task.

SUMMARY

According to various embodiments, a method, system and non-transitory machine readable medium for operation objects discovery from operation data are disclosed herein.

In one embodiment, a computer-implemented method for operation objects discovery from operation data, includes performing pattern matching of operation data with patterns in a database. There is an identifying of fields in the operation data having matching patterns with the database as first potential objects. Data profiling is performed on unmatched fields of the operation data to generate data profiles. Field classifying of the data profiles is performed to generate second potential objects, and the first potential objects and the second potential objects are de-duplicated to generate operation objects.

In an embodiment, the identifying of fields in the operation data is performed automatically without selection of fields by using a field name or a meaning of a field.

In an embodiment, the de-duplicating of the first potential objects and the second potential objects is performed in response to determining that at least two of the first potential objects and second potential objects have the same value and different field names in different indices.

In an embodiment, the database is updated with the generated data profiles.

In an embodiment, the database with generated operation objects.

In an embodiment, a field classifier is trained with the generated data profiles as a training set prior to generating the second potential objects.

In an embodiment, the training of the field classifier includes inputting one or more of patterns, rules, data profiles and models from the database.

In an embodiment, the pattern matching module performs the pattern matching with operation data retrieved from a system log.

In one embodiment, a system for operation objects discovery from operation data includes a pattern matching module configured to perform pattern matching on operation data with patterns in a database, and to identify fields in the operation data having matching patterns with the database as first potential objects. A data profiling module is configured to perform data profiling on unmatched fields of the operation data to generate data profiles. A field classifier module is configured to classify the generated data profiles and to generate second potential objects. A de-duplication module is configured to remove duplicate objects among the first potential objects and the second potential objects, and to generate operation objects.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 is an illustrative example of log data, consistent with an illustrative embodiment.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Aspects of the present disclosure are applicable to both hybrid cloud computing and multi-cloud computing. It is to be understood that multi-cloud computing may include hybrid cloud computing as a component.

When workloads are distributed across multi-cloud computing environments, there are segmented operations that can be analyzed to enhance system operation. For example, system visualization, statistical analysis and pattern mining, operation correlation, and deployment management can be monitored based on operation information associated with the distributed workloads.

The various aspects of the present disclosure provide an improvement in multi-cloud and hybrid cloud operation by providing multiple level monitoring and detection of segmented operations, errors, faults, trends, patterns, warnings of various platforms that are operating across multiple clouds that would otherwise present significant difficulty in such monitoring and detection. In addition, the present disclosure provides an improvement in computer operations that is capable of monitoring multiple levels of multi-cloud operation. The monitoring of multi-cloud operations permits an improvement in operations management, fault detection, trends, etc., just to name a few non-limiting examples. In addition, the present disclosure, in part through the application of the de-duplication of potential objects, provides for an improvement in network efficiency by reducing the overall network throughput, and more efficient storage utilization by reducing network data transfers to reduce the number of bytes that are transmitted.

Example Architecture

Multi-cloud computing architecture includes the components and subcomponents that are used for multi-cloud computing. For example, platforms such as a front end platform with front end software architecture, a back end platform with back end software architecture, a network and a multi-cloud based delivery. The front end architecture may include a user interface and enables the user to interact with cloud computing software. Web browsers, local networks and common web apps are examples of the front end software architecture. The back end architecture includes hardware and storage, and includes management and security.

Figure 1:
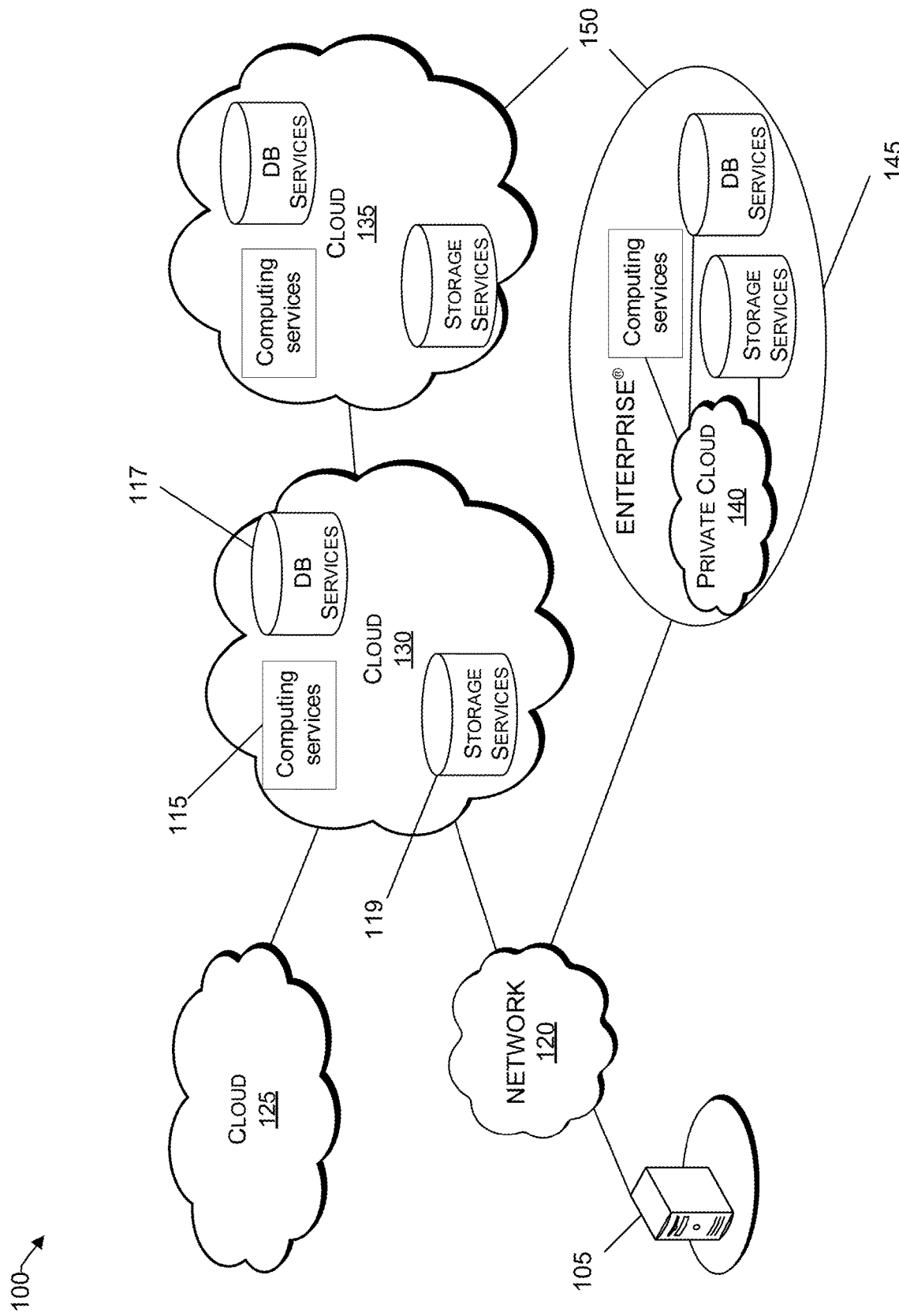
FIG. 1 is an illustration of a multi-cloud computing architecture, consistent with an illustrative embodiment.

FIG. 1 is an illustration of a multi-cloud computing architecture 100, consistent with an illustrative embodiment. It is to be understood that the architecture shown in FIG. 1 is provided for illustrative purposes and the present disclosure is not in any way limited to the arrangement shown and described. A user interface 105, which may include a server, laptop, desktop, tablet, smart device, etc. communicates with network 120 to access a multi-cloud environment 125, 130, 135, 140 that includes public clouds 125, 130, 135, and a private cloud 140 that is part of an Enterprise™ platform 145.

Each of the public clouds 125, 130, 135 can include, for example, computing services 115, database services 117, and storage services 119. One or more of the clouds 125, 130, 135, 140 shown may have fewer services, or more services, than shown. The private cloud 140 that is part of the Enterprise® platform 145 in this illustrative embodiment also includes the computing services 115, database services 117, storage services 119. The hybrid cloud 150 is formed by, for example, a public cloud 135 and the Enterprise® platform 145 having the private cloud 140 managed by a user.

Example Block Diagram

Figure 2:
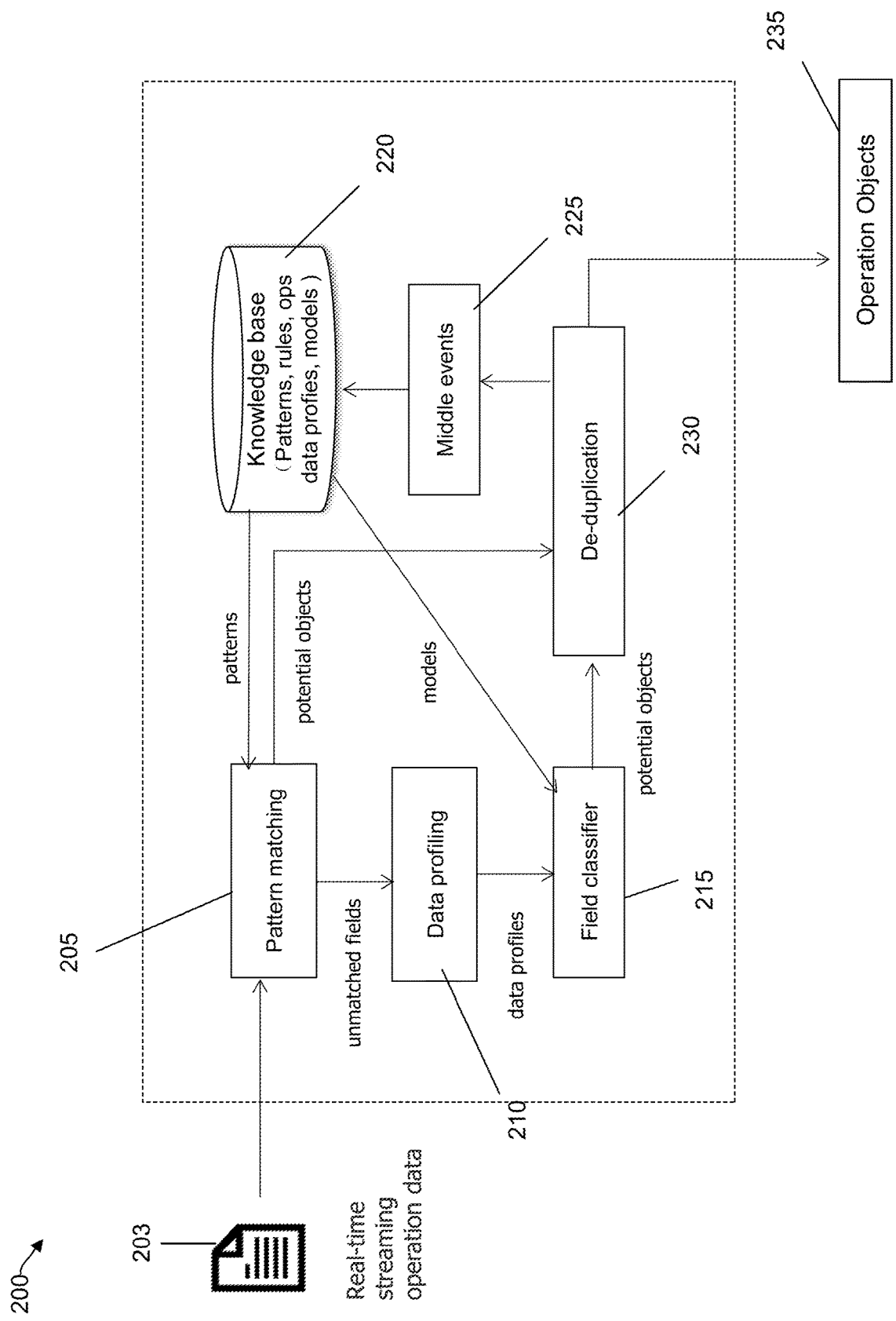
FIG. 2 is an illustration of a system for operation objects discovery, consistent with an illustrative embodiment.

Reference now is made to FIG. 2, which is an example block diagram of a system 200 that is configured to perform operation objects discovery from operation data, consistent with an illustrative embodiment.

A real time streaming operation 203 includes operation data that is input to a pattern matching module 205. The pattern matching module 205 is communicatively coupled to a knowledge base 220 (e.g., a data storage) that includes, for example, patterns rules, operation data profiles, models, etc. The pattern matching module 205 is configured to extract fields (e.g., strings) with patterns from the streams of operation data that match the patterns from the knowledge base as potential objects. The pattern matching module generates first potential objects based on the matching patterns.

A data profiling module 210 is configured to profile the distribution of each field with various types of values. Data profiling, which is also known to a person of ordinary skill in the art as data quality analysis, data assessment, or data discovery, is a process by which data is analyzed and statistics may be collected.

A field classifier 215 receives data profiles from the data profiling module 215 and is configured to identify additional potential objects for discovery. For example, pattern matching can be leveraged to train the field classifier 215 by use of the data profiling module 210 outputs potential objects based on the received data profiles from the data profiling module 210.

In an embodiment, the field classifier 215 is trained by Artificial Intelligence (AI), such as machine learning, to classify the data profiles as second potential objects. While in the present embodiment the field classifier 215 can be trained by supervised learning using a training set, it is within the present disclosure that unsupervised learning can be used. The field classifier module 215 may receive the pattern information, data profiles, from the knowledge base 225. Certain patterns may be taught to the field classifier 215 as indicative of particular classes, or possible error patterns or warnings.

The de-duplication module 230 can receive potential objects from multiple sources such as the first potential objects from the pattern matching module 205 and the second potential objects output from the field classifier 215. The de-duplication module 230 is configured to remove duplicate data. For example, the same data may have multiple names, and takes up storage space and wastes computer resources and network resources due to duplicative processing. In this illustrative embodiment, potential objects with different field names in different indexes are identified. The duplicative data and names may be deleted, or the duplicative names may be linked to the same-value data. The de-duplication module is configured to output the de-duplicated data as discovered operation objects 235.

The middle events module 225 is configured to update the knowledge base 220 by appending typical operation object patterns and rules. Accordingly, the system shown and described in FIG. 2 is configured to discover and identify operation objects from operation data automatically. The system shown in FIG. 2 also de-duplicates potential objects and updates the knowledge base 220 with newly identified patterns, profiles, and modules.

FIG. 3 is an example of log data 305, consistent with an illustrative embodiment. Operational data, which is in this illustrative embodiment stored in logs, can have attributes that can be identified and extracted. There are various fields such as "class", "fun", "host", "api", "user", "bookings", "id", "customerID", "flightId" and "dateofBooking". The fields in the log include various attributes, and the type of attributes can be text, numerical, or a combination of numerical and text attributes. The operation data, which includes logs of information, is analyzed to discover operation objects.

Figure 4:
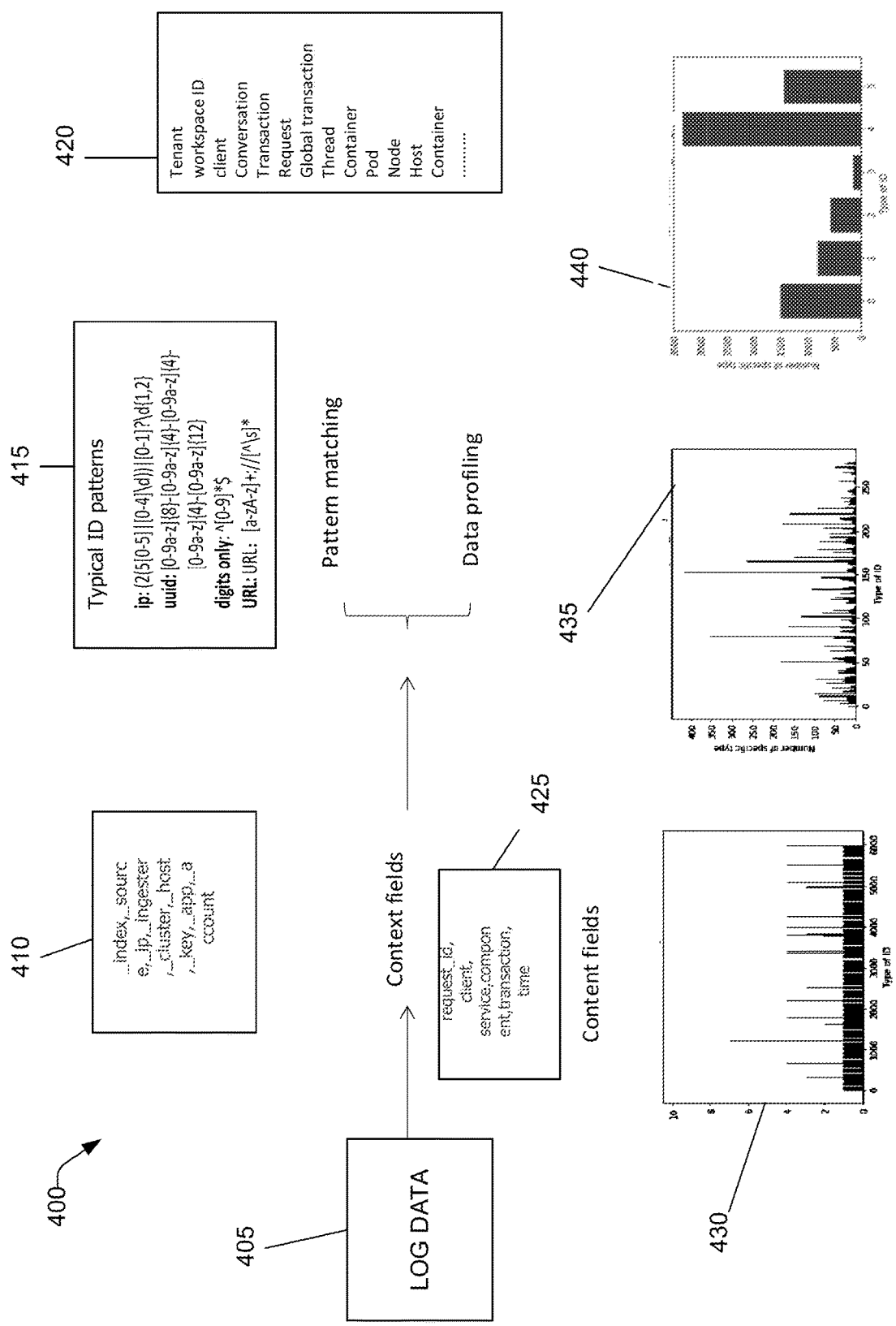
FIG. 4 illustrates an overview of a method of operation objects discovery, consistent with an illustrative embodiment.

FIG. 4 illustrates an overview 400B of a method of operation objects discovery, consistent with an illustrative embodiment. The log data 405 can be operation data, similar to the log data 305 in FIG. 3. The log data 305 includes context fields 410, such as index, source, Internet Protocol (ip), ingester, cluster, host, key, app, and a count. Typical ID patterns 415 are shown including ip, universal unique identifier (uuid), digits and a uniform resource locator (URL).

The pattern matching and data profiling is performed as discussed in the illustrative embodiment of FIG. 2, in which unmatched fields and data profiles can be classified to generate operation objects Box 420 shows named fields of operation objections, such as workspace ID, client, conversation, transactions, container, thread etc. items in content fields that are analyzed for pattern match and data profiling. FIG. 4 also shows graphs of a distribution request ID 430, distribution of request 435, and a distribution of user information.

Example Process

Figure 5:
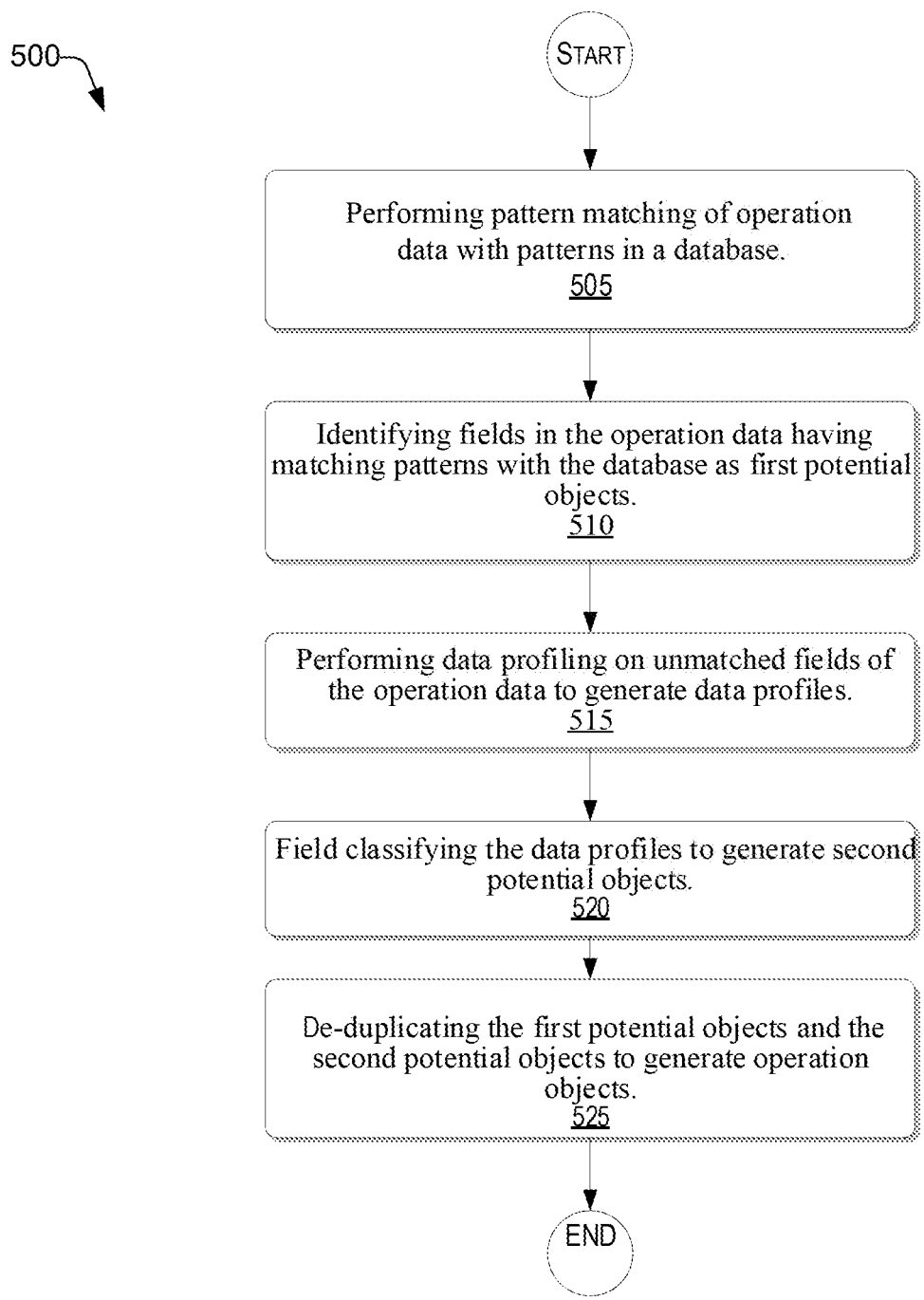
FIG. 5 is a flowchart illustrating a method of operation objects discovery, consistent with an illustrative embodiment.

With the foregoing overview of the example architecture 100 and conceptual block diagram of a system 200, it may be helpful now to consider a high-level discussion of an example process. To that end, FIG. 5 presents an illustrative process related to various aspects of a computer-implemented method for operation objects discovery from operation data. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

At operation 505, there is a performing of pattern matching of operation data with patterns in a database. The operation data can be real-time operation data. Alternatively, the operation data may be stored in a system log.

At operation 510, fields in the operation data that have matching patterns with the database are identified as first potential objects by the pattern matching module 205.

At operation 515, data profiling is performed on unmatched fields of the operation data to generate data profiles by the data profiling module 210.

At operation 520, the data profiles are field classified to generate second potential objects. The field classifier 215 may be trained with a training set of data profiles.

At operation 525, there is a de-duplicating of the first potential objects and the second potential objects to generate operation objects from the operation data. The process in FIG. 5 then ends.

Example Computer Platform

Figure 6:
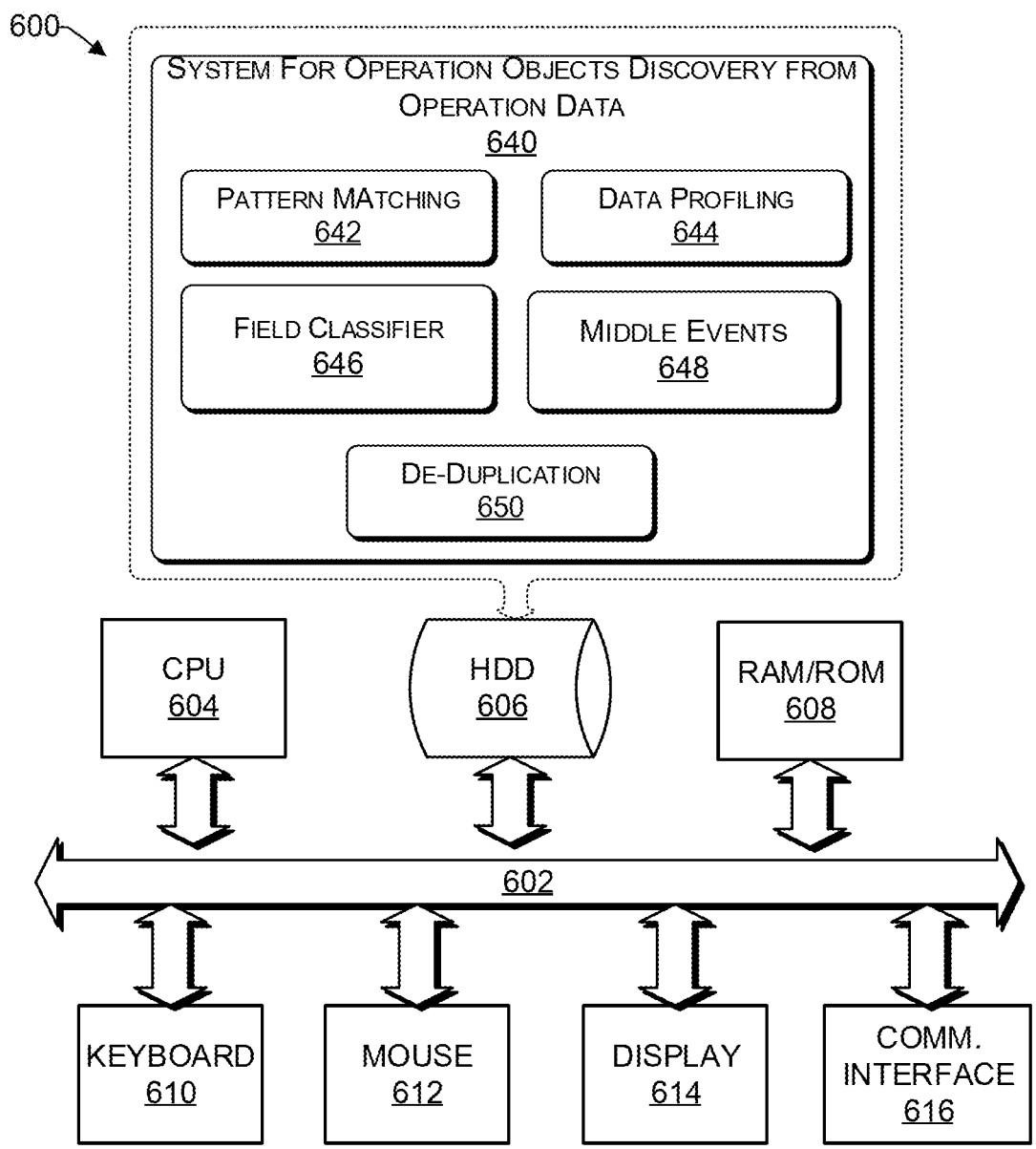
FIG. 6 is a functional block diagram illustration of a computer hardware platform that can communicate with various networked components, consistent with an illustrative embodiment.

Referring now to FIG. 6, functions relating to attribute discovery for operation objects from operation data can be performed with the use of one or more computing devices connected for data communication via wireless or wired communication, as shown in FIG. 1 and in accordance with the process 500 of FIG. 5.

FIG. 6 provides a functional block diagram illustration of a computer hardware platform that is capable performing attribute discovery for operation objects from operation data, as discussed herein. In particular, FIG. 6 illustrates a network or host computer platform 600, as may be used to implement an appropriately configured server, such as the server 105 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the system for operation objects discovery from operation data 640, in a manner described herein. The engine system may have various modules configured to perform different functions.

For example, there is a pattern matching module 642 that is configured to perform pattern matching on operation data with patterns in a database, and to identify fields in the operation data having matching patterns with the database as first potential objects. In one embodiment, there is a data profiling module 644 configured to perform data profiling on unmatched fields of the operation data to generate data profiles.

A field classifier 646 is configured to classify the generated data profiles and to generate second potential objects. In addition, a middle events module 648 is configured to update the database with the generated data profiles generated by the data profiling module. The middle events module is also configured to find all accessible paths indicating error propagation and identifies potential causes for each annotated node. A de-duplication module 650 is configured to remove duplicate objects among the first potential objects and the second potential objects, and to generate operation objects.

In one embodiment, a program, such as Apache™, can be stored for operating the system as a Web server. In one embodiment, the HDD 606 can store an executing application that includes one or more library software modules, such as those for the Java™ Runtime Environment program for realizing a JVM (Java™ virtual machine).

Example Cloud Platform

As discussed above, functions relating to managing one or more client domains, may include a cloud 100 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
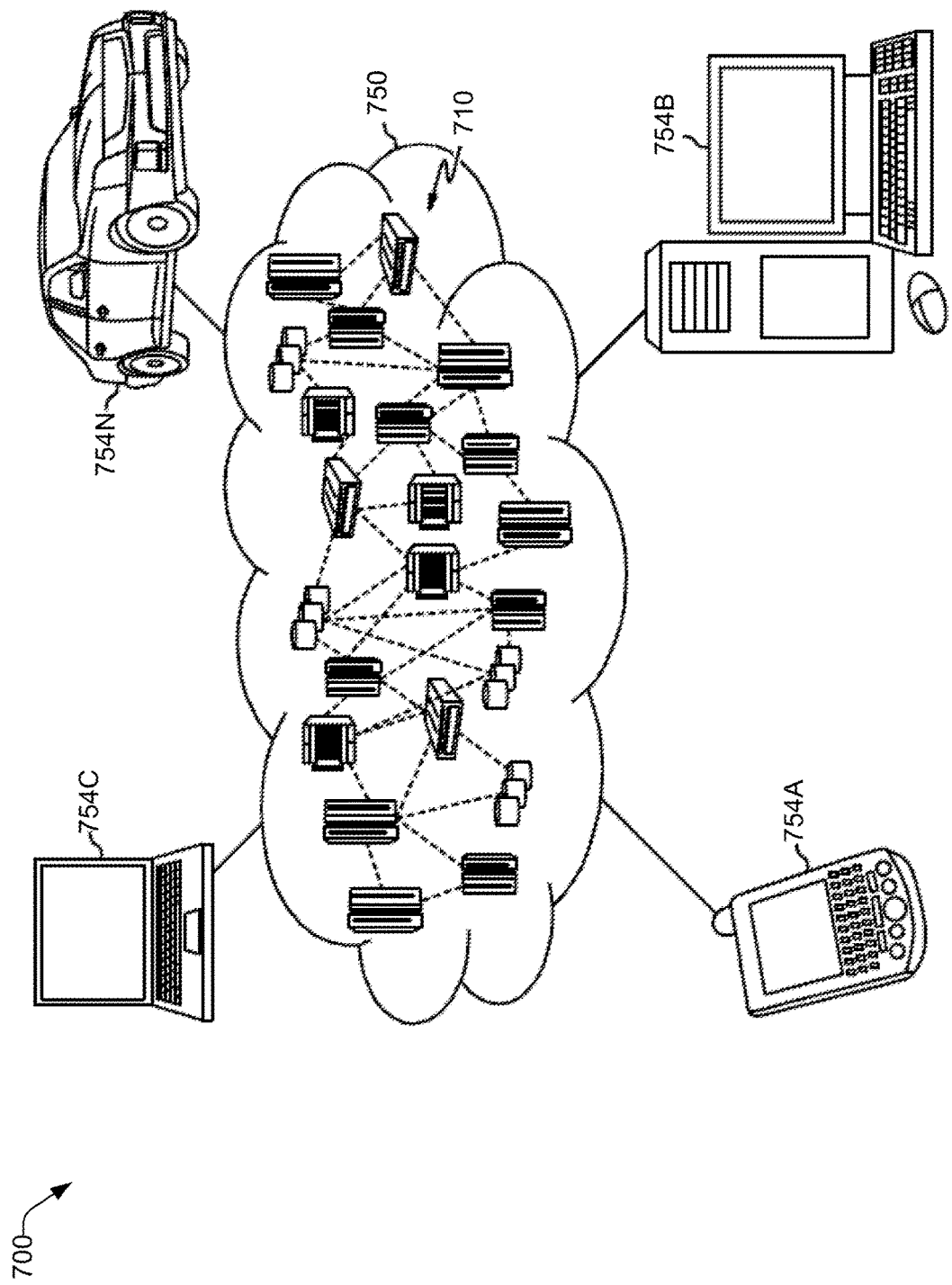
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 610 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
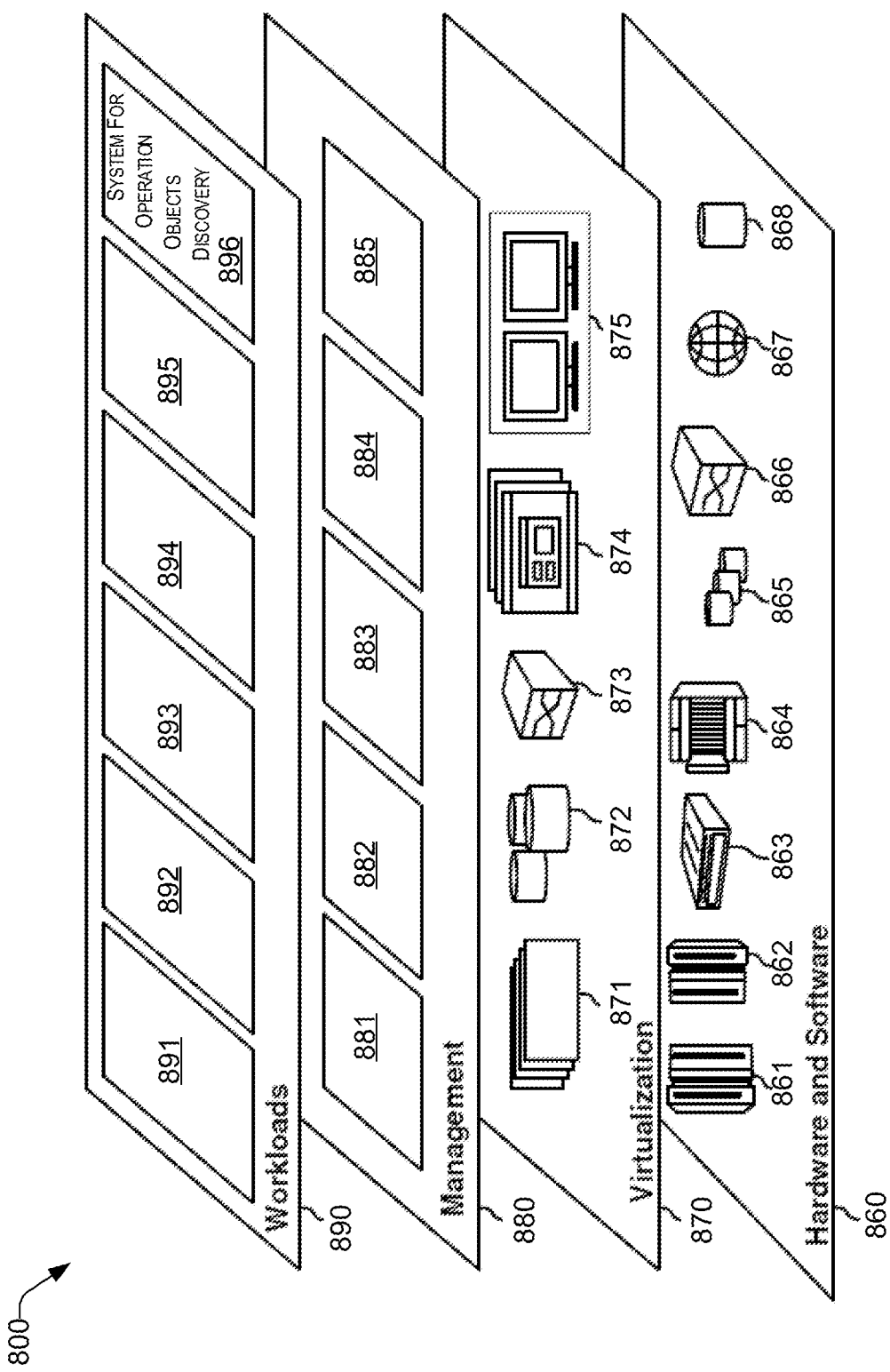
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and a system for operation objects discover from operation data 896, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of monitoring operation objects of a distributed workload multi-cloud computing platform, comprising:
    receiving a workload;
    distributing the received workload to the multi-cloud computing platform;
    monitoring a real-time streaming operation data of the distributed workload multi-cloud computing platform by a pattern matching module of a computing device;
    performing, by the pattern matching module of the computing device, pattern matching of the real-time streaming operation data with patterns in a database;
    identifying each field in the operation data having matching patterns with the database as first potential objects;
    performing data profiling on each of unmatched fields of the operation data to generate data profiles to profile the distribution of each field with various types of values, wherein the data profiling comprises analyzing the unmatched fields of the operation data and collecting statistics therefrom;
    field classifying the data profiles to generate second potential objects based on the data profiles of the unmatched fields of the operation data, by a field classifier module operative to identify a particular class, a possible error pattern, and/or a warning pattern in the data profiles of the unmatched fields;
    relieving a storage space of the multi-cloud computing platform by de-duplicating the first potential objects and the second potential objects by deleting duplicative data of the first potential objects and the second potential objects when generating operation objects in response to determining that at least two of the first potential objects and the second potential objects have a same value and different field names in different indices;
    updating a knowledge base of the de-duplicated data of the first potential objects and the second potential objects; and
    detecting at least one of segmented operations, errors, and/or faults in the distributed workload multi-cloud computing platform based on the generated operation objects.

2. The computer-implemented method according to claim 1, wherein identifying fields is performed automatically without a selection of fields by using a field name or a meaning.

3. The computer-implemented method according to claim 1, further comprising updating the database with the generated data profiles.

4. The computer-implemented method according to claim 1, further comprising updating the database with the generated operation objects.

5. The computer-implemented method according to claim 1, further comprising training a field classifier with the generated data profiles prior to generating the second potential objects.

6. The computer-implemented method according to claim 5, wherein training the field classifier includes inputting one or more of patterns, rules, data profiles, and models from the database.

7. The computer-implemented method according to claim 1, wherein a pattern matching module performs the pattern matching with operation data retrieved from a system log.

8. A computer implemented system having a computer processor coupled to a memory configured to monitor operation objects of a distributed workload multi-cloud computing platform, comprising:
receiving a workload;
distributing the received workload to the multi-cloud computing platform;
monitoring a real-time streaming operation data of the distributed workload multi-cloud computing platform by the computer processor;
a pattern matching module stored in the memory configured to perform pattern matching on the real-time streaming operation data with patterns in a database, and to identify each field in the operation data having matching patterns with the database as first potential objects;
a data profiling module stored in the memory configured to perform data profiling on each of unmatched fields of the operation data to generate data profiles to profile the distribution of each field with various types of values, wherein the data profiling comprises analyzing the unmatched fields of the operation data and collects statistics therefrom;
a field classifier module stored in the memory operative to classify the generated data profiles and to generate second potential objects based on the data profiles of the unmatched fields of the operation data and identify a particular class, a possible error pattern, and/or a warning pattern in the data profiles of the unmatched fields;
a de-duplication module stored in the memory configured to relieve a storage space of the multi-cloud computing platform by removing duplicate objects among the first potential objects and the second potential objects, and to generate operation objects in response to determining that at least two of the first potential objects and the second potential objects have a same value and different field names in different indices; and
detecting at least one of segmented operations, errors, and/or faults in the distributed workload multi-cloud computing platform based on the generated operation objects.

9. The system according to claim 8, wherein the pattern matching module stored in the memory is further configured to perform identifying fields automatically without a selection of fields by using a field name or a meaning.

10. The system according to claim 8, further comprising a middle events module stored in the memory configured to update the database with the generated data profiles generated by the data profiling module.

11. The system according to claim 8, wherein the middle events module stored in the memory is configured to update the database with generated operation objects.

12. The system according to claim 8, wherein the field classifier module stored in the memory is trained with a training set comprising the generated data profiles prior to generating the second potential objects.

13. The system according to claim 8, wherein the field classifier module stored in the memory is trained with a training set comprising one or more of patterns, rules, data profiles or models from the database.

14. The system according to claim 8, wherein the operation data is retrieved from a system log.

15. A non-transitory computer readable storage medium tangibly embodying a computer readable program code having computer readable instructions that, when executed, causes a computer device to perform a method of monitoring operation objects of a distributed workload multi-cloud computing platform, the method comprising:
receiving a workload;
distributing the received workload to the multi-cloud computing platform;
monitoring a real-time streaming operation data of the distributed workload multi-cloud computing platform by a pattern matching module of a computing device;
performing, by the pattern matching module of the computing device, pattern matching of the real-time streaming operation data with patterns in a database;
identifying each field in the operation data having matching patterns with the database as first potential objects;
performing data profiling on each of unmatched fields of the operation data to generate data profiles to profile the distribution of each field with various types of values, wherein the data profiling comprises analyzing the unmatched fields of the operation data and collects statistics therefrom;
field classifying the data profiles to generate second potential objects based on the data profiles of the unmatched fields of the operation data, by a field classifier module operative to identify a particular class, a possible error pattern, and/or a warning pattern in the data profiles of the unmatched fields;
relieving a storage space of the multi-cloud computing platform by de-duplicating the first potential objects and the second potential objects by deleting duplicative data of the first potential objects and the second potential objects when generating operation objects in response to determining that at least two of the first potential objects and the second potential objects have a same value and different field names in different indices;
updating a knowledge base of the de-duplicated data of the first potential objects and the second potential objects; and
detecting at least one of segmented operations, errors, and/or faults in the distributed workload multi-cloud computing platform based on the generated operation objects.

16. The non-transitory computer readable storage medium according to claim 15, wherein identifying fields is performed automatically without a selection of fields by using a field name or a meaning.

17. The non-transitory computer readable storage medium according to claim 15, further comprising training a field classifier with the generated data profiles prior to generating the second potential objects.

* * * * *